Oct. 2, 1956

H. L. C. WENK, JR 2,764,861

SEAL PRESS MECHANISM

Filed June 23, 1953

3 Sheets-Sheet 1

INVENTOR.
Henry L. C. Wenk, Jr.,
BY George S. Richards
Attorney

Oct. 2, 1956   H. L. C. WENK, JR   2,764,861
SEAL PRESS MECHANISM
Filed June 23, 1953   3 Sheets-Sheet 2

Oct. 2, 1956

H. L. C. WENK, JR 2,764,861

SEAL PRESS MECHANISM

Filed June 23, 1953

3 Sheets-Sheet 3

INVENTOR.
Henry L. C. Wenk, Jr.,
BY George D. Richards
Attorney

United States Patent Office 2,764,861
Patented Oct. 2, 1956

2,764,861

SEAL PRESS MECHANISM

Henry L. C. Wenk, Jr., Garden City, N. Y., assignor to American Casting & Mfg. Corporation, a corporation of New York Application June 23, 1953, Serial No. 363,599

2 Claims. (Cl. 53—135)

This invention relates to improvements in seal press mechanism for securing a tie cord and seal about an article to be protected thereby, and especially for securing a tie cord and seal around the mouth of a coin bag to close and seal the same against unauthorized opening.

The invention has for an object to provide an easily and quickly manipulatable mechanism whereby a tie cord, which is applied around the closed mouth portion of a coin bag or around any other article to be sealed, can be drawn through an associated deformable seal body to tightly constrict the tie cord in place, and thereupon, while the tie cord is held against relaxation, compressing said seal body in securely bound relation to the tie cord end portions, thus sealing the bag or other article against unauthorized access to its content. The term "tie cord" is intended to include any flexible strand material even metallic wire.

Figure 1:
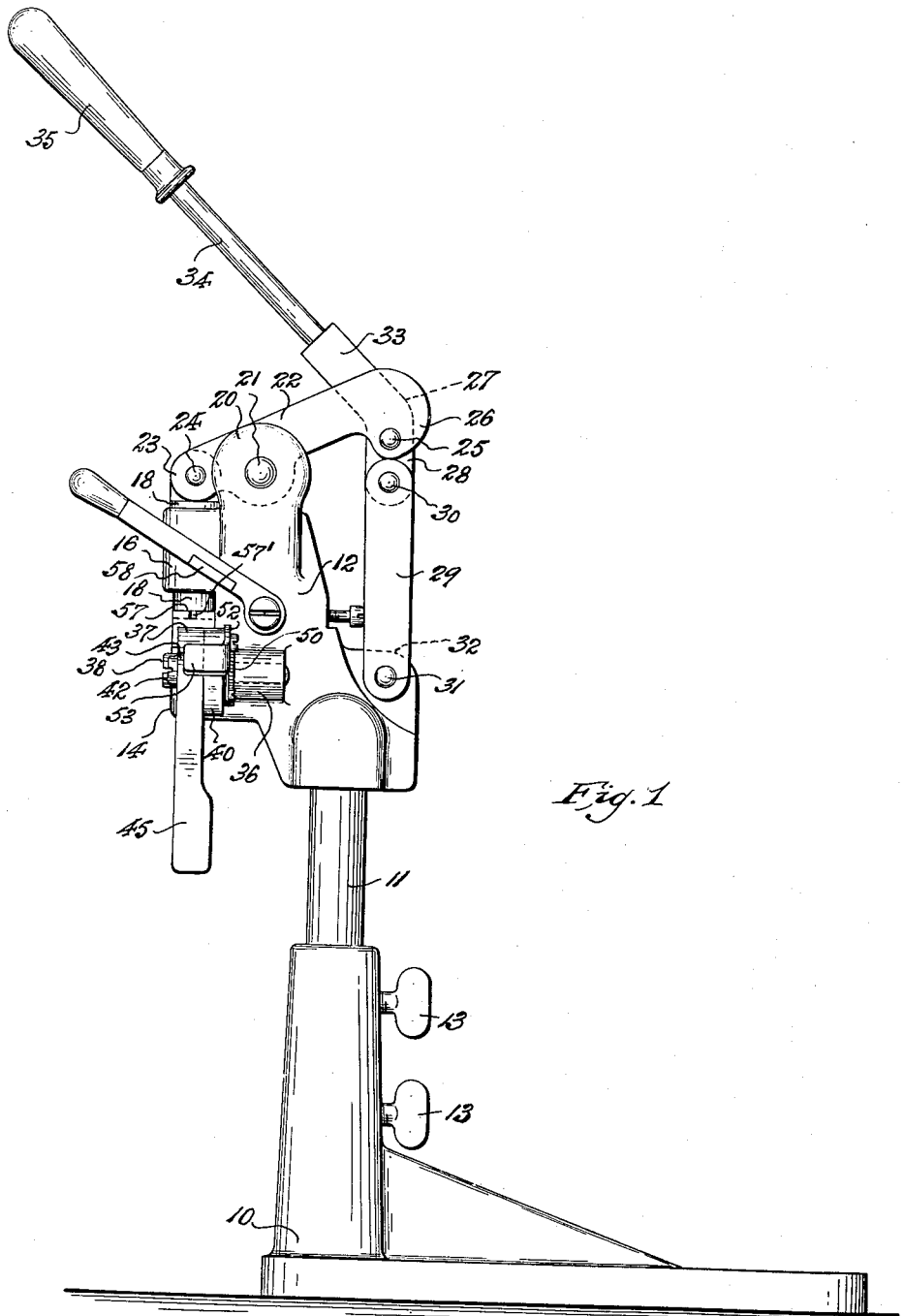
Figure 2:
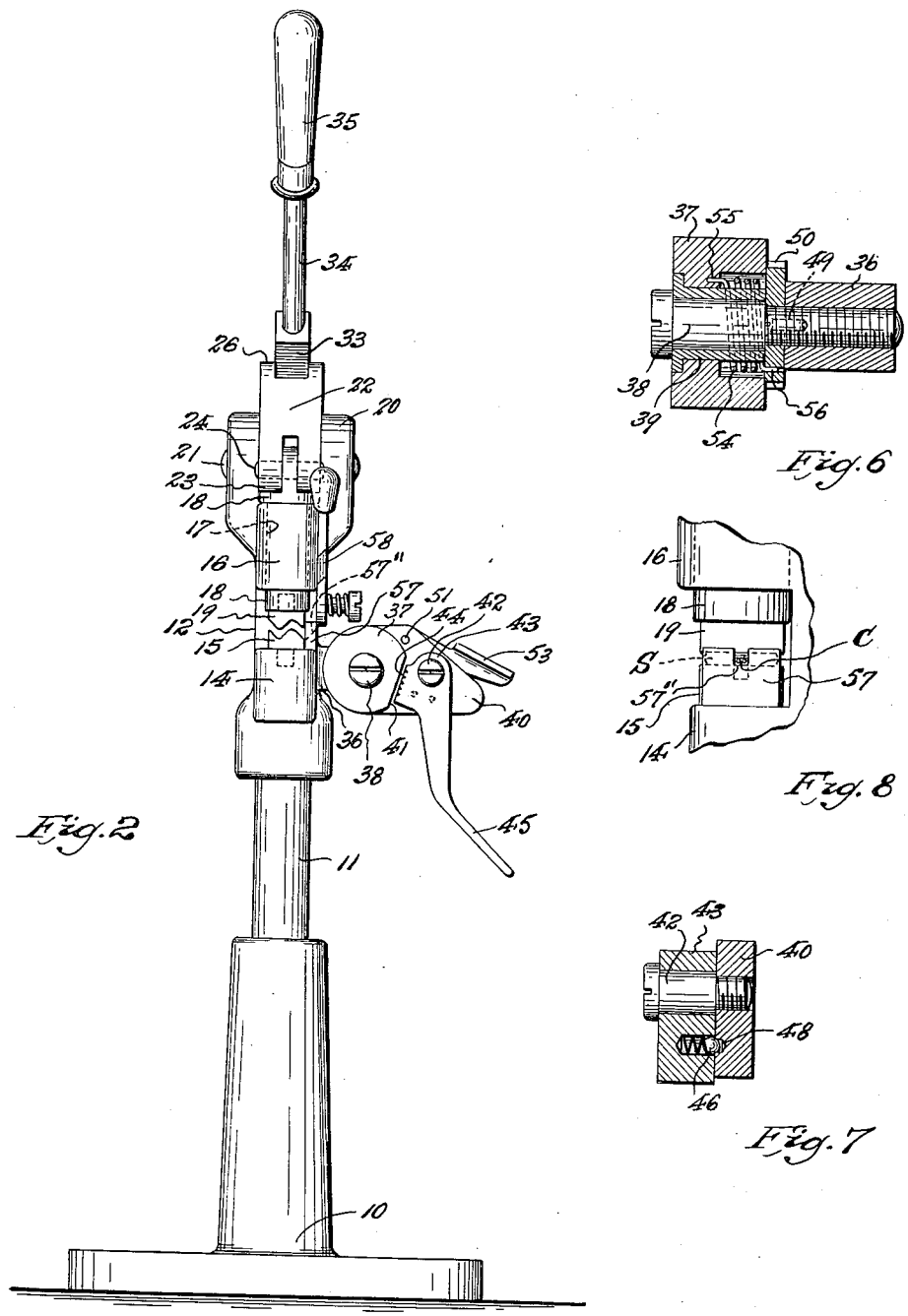

The above and other objects will be understood from a reading of the following detailed description of this invention in connection with the accompanying drawings, in which:

Fig. 1 is a side elevational view of the seal press mechanism according to this invention, and Fig. 2 is a front elevational view of the same.

Figure 3:
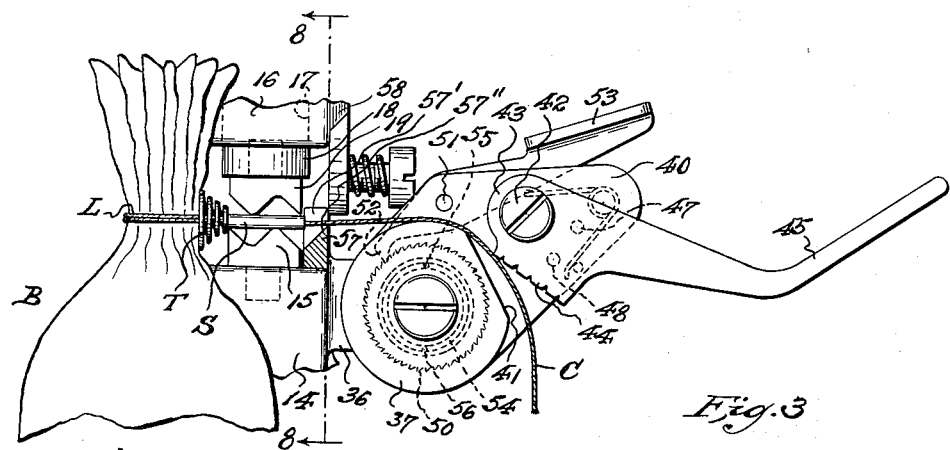
Figure 4:
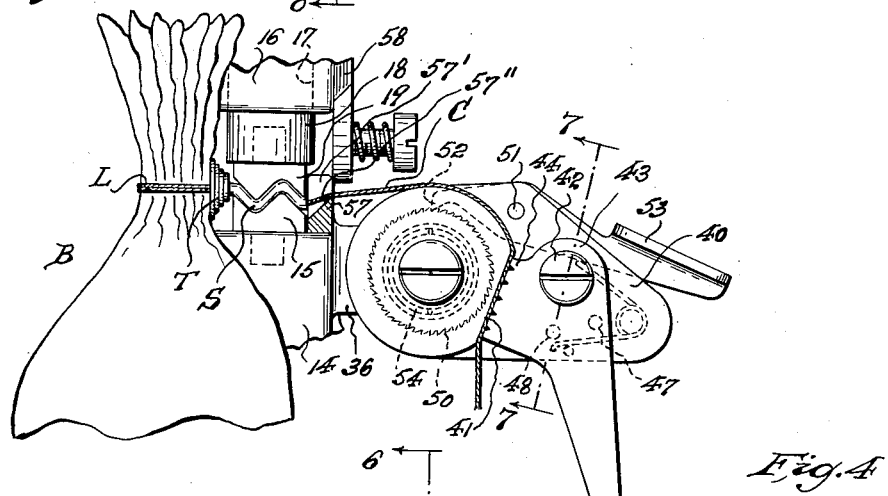

Fig. 3 is a fragmentary front elevational view of the seal press mechanism drawn on an enlarged scale, and showing a coin bag with a tie cord and seal body applied thereto as initially related to the mechanism preparatory to operation of the latter for tie cord tightening and seal body compressing effect; and Fig. 4 is view similar to that of Fig. 3 showing the operation of the tie cord tightening and seal body compressing devices of the mechanism.

Figure 5:
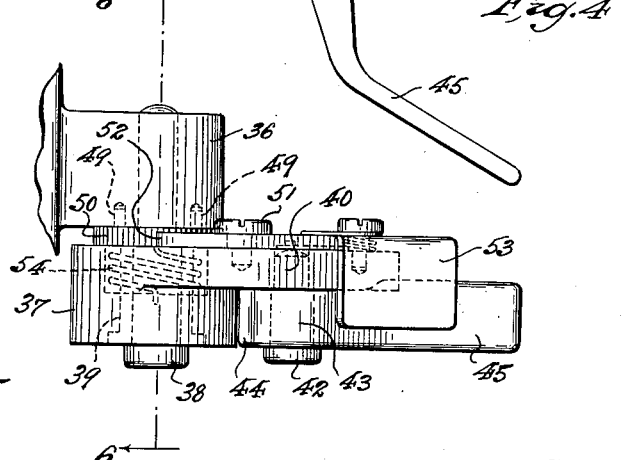

Fig. 5 is a fragmentary plan view of the tie cord tightening device of the mechanism with its parts in the operative positions shown in Fig. 4; Fig. 6 is a cross-sectional view, taken on line 6—6 in Fig. 5; Fig. 7 is a cross sectional view, taken on line 7—7 in Fig. 4; and Fig. 8 is a fragmentary sectional view, taken on line 8—8 in Fig. 3.

Similar characters of reference are employed in the above described views, to indicate corresponding parts.

The seal press mechanism of this invention is adapted to be suitably fixed upon a work table or bench in upstanding position thereon, and comprises a base structure 10 from which extends an upright column 11 by which the head member 12 of the press mechanism is supported. The column 11 is vertically adjustable relative to the base structure 10, whereby to so position the head member 12 as to accommodate its disposition to various sizes or heights of bags to be sealed. The column 11 is secured in adjusted relation to the base structure 10 by set screws 13 with which the latter is provided, or by any other suitable fastening means.

Projecting from the front of the head member 12 is an anvil member 14 upon the upper face of which a lower seal body compressing jaw or die 15 is suitably fixed. Also projecting from the front of the head member 12, above and in aligned opposed and spaced relation to the anvil member 14, is a guide member 16 which is provided with a perpendicular slideway 17. Vertically reciprocable in said slideway 17 is a plunger 18 to the lower end of which is fixed an upper seal body compressing jaw or die 19 that is complementary to and cooperative with said lower seal body compressing jaw or die 15. Projecting upwardly from the top end of the head member 12, in rearwardly offset relation to the guide member 16, is a fork 20 by and between the perforate ears of which is mounted a fulcrum pin 21. Pivotally supported by said fulcrum pin 21 is a compression lever 22, to the forward end 23 of which the upper end of the plunger 18 is pivotally connected by a cross pin 24. Pivotally connected by a cross pin 25 to the rearward end 26 of the compression lever 22 is a toggle lever 27, the lower arm 28 of which is pivotally connected to and between the upper ends of anchoring links 29 by a cross-pin 30. The lower ends of said anchoring links 29 are pivotally connected by a cross-pin 31 to an anchor lug 32 that is part of and projects rearwardly from the back of the head member 12. Affixed to the upper arm 33 of the toggle lever 27, in extension therefrom, is a hand lever 34, which is provided at its free end with a suitable handle member 35 by which it can be grasped and manipulated.

Connected with a side of the head member 12, preferably as an integral part thereof, to project laterally outward therefrom substantialy in a plane adjacently parallel to that of the top of the anvil member 14, is a bracket arm 36. Supported by this bracket arm 36 is a device for pulling a tie cord through an associated seal body into tightly constricted engagement with and around the closed mouth of a coin bag, or around any other article to be sealed, preparatory to compressing said seal body into grippingly bound relation to the tightened tie cord. This pulling device comprises a puller drum 37 which is rotatably supported on a stud shaft 38 that is affixed to said bracket arm 36 to project outwardly from the forward side face thereof. Said puller drum is preferably provided with a bearing bushing 39 intermediate the same and said stud shaft 38. Integral with said puller drum 37, to extend radially outward therefrom in the plane of its inner face or end, is a lever extension 40, by which said puller drum can be rotated about said stud shaft 38. The periphery of said puller drum 37 is provided with a suitably located flattened tie cord gripper face 41. Pivotally mounted on a fulcrum stud 42, which is carried by the lever extension 40 of the puller drum, is a rotatively movable tie cord gripper member 43 which is provided at its inner end with a gripper jaw 44 to oppose the gripper face 41 of the puller drum, and which is provided at its outer end wtih a suitably shaped lever member 45 by which it can be manipulated. Preferably, a yieldable detent means 46 (see Fig. 7) is carried by said gripper member 43 to selectively engage spaced apart detent sockets 47 and 48 with which the contiguous face of the puller drum lever extension 40 is provided, whereby, when engaged in the outer detent socket 47, to yieldably hold the gripper member 43 in a normal initial withdrawn or open relation to the gripper face 41 of the puller drum (see Fig. 3), and, when engaged in the inner detent socket 48, to yieldably hold the gripper member 43 in closed or tie cord gripping relation to said gripper face 41 of the puller drum (see Fig. 4).

Affixed to said bracket arm 36, by fastening screws 49, to lie between said bracket arm 36 and the inner face or end of said puller drum 37 is a stationary ratchet wheel 50 disposed concentric to said puller drum. Mounted on a pivoting stud 51, which projects from the rear face of the puller drum lever extension 40, is a spring pressed pawl 52 which normally engages the ratchet wheel 50. The rear end of said pawl 52 is shaped to provide a lever arm 53 by means of which, at desired times, the pawl can be manually disengaged from the ratchet wheel 50, whereby to release the puller drum from the restraint thereof. Housed within the puller drum 37 is a torsional spring 54, one end 55 of which is affixed to said puller drum, and the opposite end 56 of which is affixed to the stationary ratchet wheel 50. This spring 54 functions to return the puller drum to a normal initial position when released from the restraint of the check pawl 52 after rotation of said puller drum to tie cord tightening position has been effected and the associated seal body compressed into grippingly bound relation to the tightened tie cord.

Intermediate the anvil member 14 and the puller drum 37 is a stationary knife blade 57 which is suitably affixed to the head member 12. Pivotally mounted on the side of the head member 12 is a manipulatable movable knife blade 58 which is cooperative with said stationary knife blade 57. Said stationary knife blade 57 is located behind and close to the compressing jaws or dies 15 and 19, so as to be disposed intermediate the same and the puller drum 37, and is of a height adapted to bridge the gap between said compressing jaws or dies when the latter are separated for insertion of a seal body therebetween, whereby to serve as a stop against which the opposed end of the inserted seal body is abutted, so as to be held against displacement relative to the compressing jaws or dies 15 and 19 during the tightening of the tie cord by the puller drum when the press is operated. The upper free marginal portion of the stationary knife blade 57 is indented by a notch 57' which provides a passage through which the tie cord extends from the seal body to the puller drum of the tie cord tightening mechanism. The bottom margin of said notch 57' is beveled to provide a cutting edge 57" with which the movable knife blade 58 cooperates.

In the use and operation of the seal press mechanism of this invnetion, as, for example, to seal the closed mouth of a coin bag B, the mouth of the bag is gathered into closed condition, and then the loops L of the tie cord C of a bag seal are caused to encircle the closed bag mouth, with the free end portions of the tie cord extending through a suitable tensioning member T and thence slidably through the seal body S, which is usually made of lead. The bag seal having been thus initially applied to the bag, B, the latter is placed in front of the press, and the hand lever 34—35 is swung back (from the position shown in Fig. 1), whereby to raise the plunger 18 and jaw or die 19, to separate the latter from the stationary jaw or die 15, so that the seal body S can be inserted between said jaws or dies and behind the stationary knife blade against which it is stopped (see Fig. 3). The puller drum 37, being normally rotated counterclockwise by its spring 54 to an initial position wherein its lever extension 40 is upswung, and the gripper member 43 having been upswung to withdraw its gripper jaw 44 from the gripper face 41 of the puller drum, the free end portions of the tie cord C are led from the seal body S through the passage notch 57' of the stationary knife blade 57, and thence over the puller drum 37 to pass down between the gripper face 41 thereof and the gripper jaw 44 of the gripper member 43 (see Fig. 3). The press is now ready for operation.

To operate the press, the first step is to swing down the lever member 45 of the gripper member 43, thus rotating the latter to cause its gripper jaw 44 to grip the tie cord C against the gripper face 41 of the puller drum. This initial movement of the gripper member 43 imparts no down swinging movement to the puller drum lever extension 40, but thereafter continued down swinging movement of the lever member 45, the gripper jaw 44 being stopped against the puller drum, imparts down-swinging movement to the lever extension 40, thus rotating the puller drum 37 in clockwise direction, so that the tie cord gripped thereto is pulled outwardly through the seal body S, whereby to tightly constrict the tie cord loops L about the closed bag mouth, while at the same time compressing the tensioning member T between the bag and the seal body S. During this operation, the pawl 52 is caused to move over the stationary ratchet wheel 50, and by its engagement with the teeth of the latter to firmly hold the tie cord pulling assembly against yielding to the stress of the tightened tie cord C, thus securely holding the latter against any relaxation of its required tightened relation to the bag mouth, while the seal body S is being compressed to grippingly bound relation to the tie cord (see Fig. 4). To compress the seal body S, the hand lever 34—35 is swung forward to impart, through the toggle lever and compression lever, a downward thrust to the plunger 18, whereby to cause the jaws or dies 15 and 19 to close upon the interposed seal body S with strong compressing and deforming effect, whereby to grippingly bind the same to the tightened tie cord C for maintaining the latter in such tightened condition (see Fig. 4). After the seal body S has thus been compressed, the loose end portions of the tie cord C can be cut away close to the seal body S, by swinging down the knife blade 59 for cord severing cooperation with the stationary knife blade 57. The jaws or dies 15 and 19 can now be returned to normal separated relation, so that the sealed bag can be removed from the press.

The bag sealing operations having been completed, the puller drum 37 can be returned to normal initial position. This is accomplished by pressing down the lever arm 53 of the pawl 52, thus upswinging the latter, whereby to disengage the ratchet wheel 50, whereupon the torsion spring 54 of the puller drum, which has been brought under tension by the tie cord tightening rotation of the puller drum, will function to return said puller drum to normal initial position ready for a succeeding bag sealing operation of the press.

Having now described my invention, I claim:

1. A seal press mechanism operative to tighten a tie cord about an article to be sealed by pulling the cord through a seal body of compressible material and thereupon to compress the seal body into grippingly bound relation to the tightened tie cord comprising a head member having means to support the same, said head member having a forwardly projecting anvil member and a forwardly projecting guide member spaced above said anvil member in aligned relation thereto, a reciprocable plunger slidable through said guide member, opposed compressing dies respectively supported by said anvil member and said plunger between which the seal body can be interposed, a compression lever pivotally supported by the head member for reciprocating said plunger, a toggle lever system for operating said compression lever connected between the latter and said head member and including a hand lever for actuating the same, means mounted on a side of said head member adjacent to said compressing dies operative to pull the tie cord to tightened condition preparatory to actuating the compressing dies to compress the seal body, and means mounted on the head member intermediate the compressing dies and said cord tightening means for cutting away loose end portions of the tightened tie cord after the seal body is compressed, said means comprising a stationary knife blade having a portion providing a stop to hold the seal body against displacement relative to the compressing dies during the cord tightening operation, said stop portion having a passage through which the tie cord extends from the seal body to the cord tightening means, and a movable knife blade for coperation with said stationary knife blade.

2. A seal press mechanism operative to tighten a tie cord about an article to be sealed by pulling the cord through a seal body of compressible material and thereupon to compress said seal body into grippingly bound relation to the tightened tie cord comprising a head member having means to support the same, said head member having a forwardly projecting anvil member and a forwardly projecting guide member spaced above said anvil member in aligned relation thereto, a reciprocable plunger slidable through said guide member, opposed compressing dies respectively supported by said anvil member and said plunger between which the seal body can be interposed, a compression lever pivotally supported by the head member for reciprocating said plunger, a toggle lever system for operating said compression lever connected between the latter and said head member and including a hand lever for actuating the same, means mounted on a side of said head member adjacent to said compressing dies operative to pull the tie cord to tightened condition preparatory to actuating the compressing dies to compress the seal body, said latter means comprising a rotatable puller drum having a radial lever extension unitary therewith, a gripper member pivotally mounted on said lever extension for cooperation with said puller drum to grip the tie cord thereto, a lever member for moving said gripper member into cord gripping position relative to the puller drum and thereafter to swing said lever extension so as to cause tie cord pulling rotation of the puller drum, a stationary ratchet wheel axially aligned with said puller drum, a releasable pawl pivotally mounted on said lever extension for cooperation with said ratchet wheel, whereby to restrain the operatively rotated puller drum against tie cord relaxing reverse rotation while the seal body is being compressed, a torsional spring cooperative with the puller drum to return the same to normal initial position when released from the restraint of said pawl and ratchet wheel, and means mounted on the head member intermediate the compressing dies and the puller drum for cutting away loose end portions of the tightened tie cord after the seal body is compressed, said means comprising a stationary knife blade having a portion providing a stop to hold a seal body against displacement relative to the compressing dies during the tie cord tightening operation, said stop-portion having a passage through which the tie cord extends from the seal body to the puller drum, and a movable knife blade for cooperation with said stationary knife blade.

References Cited in the file of this patent

UNITED STATES PATENTS

| | | |
|---|---|---|
| 847,776 | Huising | Mar. 19, 1907 |
| 1,182,602 | Tuohy | May 9, 1916 |
| 2,267,532 | Moberg | Dec. 23, 1941 |
| 2,536,536 | Childress et al. | Jan. 2, 1951 |
| 2,560,456 | Kuoni | July 10, 1951 |
| 2,627,769 | Anderson | Feb. 10, 1953 |